United States Patent Office 2,764,567
Patented Sept. 25, 1956

2,764,567

AQUEOUS DISPERSION OF ANIMAL GLUE CONTAINING TETRAETHYLENE - PENTA-MINE-MODIFIED UREA FORMALDEHYDE RESIN

Dorothea Sawyer Phillips, Meredith, N. H., and Donald Gordon Patterson, New York, N. Y., assignors to American Cyanamid Company, New York, N. Y., a corporation of Maine No Drawing. Application February 3, 1953,
Serial No. 334,982

4 Claims. (Cl. 260—6)

This invention relates to the fortification of animal glue. More particularly this invention relates to the fortification of animal glues with a modified urea-formaldehyde condensation product.

As is well known, animal glues were perhaps the earliest used adhesive materials. Except in instances when a water resistant adhesive is required, animal glues find numerous applications in the woodworking industry and elsewhere. Inasmuch as animal glues are not water resistant, many methods have been employed to render them water resistant. For this purpose various chemicals and/or resin forming ingredients have been added to the animal glue. Formaldehyde is perhaps the most frequently used ingredient to improve the water resistance of the glue. Improved water resistance has also been obtained through the addition of carbamides and aldehydes to animal glues. However, in each of these instances while a glue may be obtained which has increased water resistance, other desirable properties such as increased pot life at elevated temperatures and quick clamp times are sacrificed. We have discovered that animal glues may be fortified with a urea-formaldehyde modified condensation product to give not only improved water resistance but also an extended pot life at elevated temperatures and quick clamp time.

It is desirable to obtain a glue which possesses an extended pot life at elevated temperatures because a quicker clamp time may be obtained when the glue is applied hot. If the glue does not have an extended pot life at elevated temperatures, the glue will set in the pot and thus be unusable. Before our invention the various fortified animal glues possessing increased water resistance could not be applied hot inasmuch as the glue would set or gel in the pot at elevated temperatures, or the time required for the glue to develop water resistance was too long to be practical.

It is an object of our invention to obtain a fortified animal glue having increased water resistance. It is a further object of our invention to obtain a fortified animal glue having an extended pot life at elevated temperatures and quick clamp times when employed as an adhesive material. These and other objects of our invention will be discussed more fully hereinbelow.

As previously stated, animal glues have been fortified with formaldehyde and/or carbamides and aldehydes. However, the pot life of glues fortified with carbamides and aldehydes at elevated temperatures have been sacrificed to obtain increased water resistance. When form-aldehyde is used alone with the animal glues, there is a tendency for the glue to be rendered insoluble and become prematurely gelatinized. We have discovered that the utilization of a urea-formaldehyde modified condensation product under certain conditions produces a fortified animal glue possessing increased water resistance, extended pot life at elevated temperatures and quick clamp properties. In combining the resin with the animal glue the principal problem is to retard the chemical reaction of the formaldehyde of the resin with the animal glue to avoid premature gelation of the mix. The addition of a formaldehyde suppressing agent to the resin just prior to its addition to the hot animal glue is found to be the best method of obtaining a long pot life at elevated temperature. The formaldehyde suppressing agent apparently preferentially combines with the formaldehyde of the resin retarding the rapid formation of a gelatin formaldehyde compound as well as assisting in fluidizing the animal glue. The animal glue is mixed with water to form an aqueous dispersion which is then heated to a temperature of from 60 to 70° C. to form a hot melt solution. An acid catalyst is introduced into the formulation to prevent polymerization of the resin while hot and to cause said formulation to gel irreversably upon cooling. The formulation is made into two components, i. e. Component "a" consisting of the animal glue and the acid catalyst and Component "b" consisting of the urea-formaldehyde modified condensation product and the formaldehyde suppressing agent. The two components of the formulation are then admixed to produce the water resistant fortified animal glue possessing an extended pot life at elevated temperatures, increased water resistance and quick clamping time.

We have attempted to use both unmodified and modified urea-formaldehyde condensation product in fortifying the animal glue. It has been found that a tetraethylene pentamine modified urea-formaldehyde condensation product may be employed. An unmodified urea-formaldehyde condensation product does not appear suitable for use with hot animal glue, inasmuch as such a resin will set at elevated temperatures. It also appears that improvement in water resistance of an animal glue fortified with an unmodified condensation product is only about equal to that obtained with a formaldehyde fortified animal glue. The following table sets forth the gel time in hours at 65° C. of various fortified animal glues. Glue I is an unmodified urea-formaldehyde fortified animal glue while Glue II is a fortified animal glue made in accordance with our invention.

TABLE I

Gel time at 65° C.

|  | I | II |
|---|---|---|
| Component "a": |  |  |
| Animal glue (33% solids)_____gms__ | 25 | 25 |
| Acid catalyst (acetic acid)_____cc__ | 0 | 1.0 |
| Component "b": |  |  |
| Resin (solids basis)_____gms__ | [1] 1.125 | [2] 1.125 |
| Formaldehyde suppressing agent (urea)_gms__ | 0 | 0.8 |
| Gel time at 65° C., hrs_____ | 0.3 | >5.5 |

[1] Urea-formaldehyde resin; 1.9:1 mol ratio formaldehyde to urea.
[2] Resin A.

In order that those skilled in the art may more fully understand our inventive concept the following examples are given by way of illustration and not limitation unless indicated in the appended claims.

FORMULATIONS

|  | I | II |
|---|---|---|
| Components "a" | | |
|   Animal glue (33% solids) gms | 25 | 25 |
|   Acid catalyst (acetic acid) cc | 1.0 | 0.5 |
| Component "b": | | |
|   Resin A (45% solids) gms | 2.5 | 2.5 |
|   Urea (32% based on resin) gms | 0.8 | 0.8 |

Component "b" was mixed at room temperature just prior to adding it to the hot Component "a." The mix was held at 65° C.

Three-ply 1/16 in. birch panels, spread at the rate of 24 gms. wet spread per square foot, were used to evaluate clamping time at 200 p. s. i. and water resistance. The following results were obtained.

| Gel Time at 65° C., Clamping time at 200 p. s. i., min. | I | | II | |
|---|---|---|---|---|
| | 5.5 hrs. Dry Shear,[1] p. s. i.— Percent W. F. | Edge,[2] inches | 5.2 hrs. Dry Shear,[1] p. s. i.— Percent W. F. | Edge,[2] inches |
| 5 | (3) | (3) | 350–0 | None |
| 10 | 300–0 | 0.75 | 310–20 | None |
| 15 | 360–0 | 0.625 | 410–10 | 0.375 |
| 30 | 350–30 | 0.875 | 410–70 | 0.625 |

[1] Dry shear—pounds per square inch and percent wood failure.
[2] Edge delamination in inches—over 2 inches unsatisfactory.
[3] Delamination due to insufficient clamp time.

The addition of from about 12 to 16% solids to solids basis of the resin of Component "b" to the glue of the mix provides a long pot life at elevated temperatures, rapid strength development at room temperature and increased water resistance. Increasing the amount of Component "b" appears to be deleterious to both clamping time and water resistance. Addition of a lesser amount of Component "b" will not produce the desired effect. Hot animal glues appear to develop strength but little faster than the hot resin animal glue formulation and have poorer water resistance. Formaldehyde fortified animal glue formulations have to be used cold, requiring long clamping time and slow development of water resistance. The following table sets forth the effect of varying the amount of component "b" in the formulation.

The urea-formaldehyde modified condensation product employed in the above-noted examples was prepared as follows:

RESIN A

All parts are by weight.

Into a glass-lined kettle equipped with an agitator, temperature gauge, heating and cooling device and a condenser system to permit refluxing was charged 678 parts of formalin (37% formaldehyde). 200 parts of urea were then added and mixed by agitation. The pH of the solution should read from about 8.5 to about 8.8 and if out of this range may be adjusted with either triethanolamine or formic acid. The mix is then heated to 70° C. and maintained there for 15 minutes. After cooling the mass to 65° C., 20 parts of tetraethylene pentamine, water and sufficient hydrochloric acid to lower the pH of the reaction mass to about 1.6 to 1.9 after 25 minutes refluxing at 70° C. were added. The pH is again adjusted after this refluxing period with 10% NaOH to bring the pH to 2.9. The reaction mixture is then cooled to and maintained at 55° C. as the viscosity increases steadily until the desired viscosity is anticipated at which point the reaction is stopped by the introduction of sufficient 10% NaOH solution. The pH on the final product is 6.8 to 7, miscible with water in all proportions and has a viscosity at 25° C. of from 150 to 250 centipoises.

The molar ratio of formaldehyde to urea may be varied from 2:1 to 3:1, but the preferred ratio is about 2.5:1. The percentage of tetraethylene pentamine modifier may be from about 8 to 12% by weight based on the weight of urea in the condensation product.

While we have employed urea as the preferred formaldehyde suppressing agent, other ingredients may be used such as tetraethylene pentamine, sodium bisulfite, dicyandiamide, melamine, acetoquanamine, hydrogen peroxide, potassium permanganate and ketones such as dimethyl ketone, methylethyl ketone and the like. The amount of the formaldehyde suppressing agent that is employed in the formulation will vary from 30 to 35% by weight based on the solids of the resin. It appears, however, that approximately 32% by weight gives the optimum results. Reducing the amount of suppressing agent to about 16% reduces the gel time appreciably and increases the clamping time necessary to obtain water resistance. Increasing the amount appears to be deleterious to both clamping time and water resistance. Table III shows the effect of varying the amount of formaldehyde suppressing agent in the glue formulation.

TABLE II

*Effect of varying Component "b"*

|  | I | | II | | III | |
|---|---|---|---|---|---|---|
| Component "a": | | | | | | |
|   Animal glue (33% solids) gms | 25 | | 25 | | 25 | |
|   Acid catalyst (acetic acid) cc | 0 | | 1.0 | | 1.0 | |
| Component "b": | | | | | | |
|   Resin[1] (45% solids) gms | 0 | | 2.5 | | 5.0 | |
|   Formaldehyde suppressing agent (Urea) gms | 0 | | 0.8 | | 1.6 | |
| Gel time at 65° C. hrs | >48 | | >5.5 | | >5.5 | |
| Clamping time at 200 p. s. i., mins.: | Dry[2] Shear, p. s. i.– W. F. | Edge,[3] Inches | Dry Shear, p. s. i.– W. F. | Edge, Inches | Dry Shear, p. s. i.– W. F. | Edge, Inches |
| 5 | 240–0 | 3.0 | (4) | (4) | (4) | (4) |
| 10 | 270–0 | | 300–0 | 0.75 | 170–0 | |
| 15 | 390–0 | 3.0 | 360–0 | 0.625 | 230–0 | 3.0 |
| 30 | | 3.0 | 350–30 | 0.875 | 230–0 | 3.0 |

[1] Resin A.
[2] Dry shear—pounds per square inch and percent wood failure.
[3] Edge delamination in inches—over 2 inches unsatisfactory.
[4] Delamination due to insufficient clamp time.

TABLE III

Effect of varying formaldehyde suppression agent

| | I | II | III | IV |
|---|---|---|---|---|
| Percent based on resin [1] | 0 | 16 | 32 | 64 |
| Gms | 0 | 0.4 | 0.8 | 1.6 |
| Gel time at 65° C., hrs | 0.3 | 1.75 | >5.5 | >5.5 |

| Clamp time at 200 p.s.i., minutes: | Dry Shear, p.s.i.-W.F. | Delamination, inches [2] | Dry Shear, p.s.i.-W.F. | Delamination, inches | Dry Shear, p.s.i.-W.F. | Delamination, inches | Dry Shear, p.s.i.-W.F. | Delamination, inches |
|---|---|---|---|---|---|---|---|---|
| 5 | | | ([3]) | ([3]) | ([3]) | ([3]) | ([3]) | ([3]) |
| 10 | | | ([3]) | 2.25 | 300-0 | 0.75 | ([3]) | ([3]) |
| 15 | | | none | none | 360-0 | 0.625 | ([3]) | 3.0 |
| 30 | | | none | none | 350-30 | 0.875 | 250-10 | 3.0 |

[1] Resin A.
[2] Edge delamination—over 2 inches unsatisfactory.
[3] Delamination due to insufficient clamp time.

Formulation:
    Component "a"—
        Animal glue (33% solids) _____ 25 gms.
        Acid catalyst (acetic acid) _____ 1.0 cc.
    Component "b"—
        Resin A (45% solids) _____ 2.5 gm.
        Formaldehyde suppressing agent (urea), gms __ As indicated.

It is necessary to incorporate into the formulation an acid catalyst to promote hydrolysis of the pot resin, counteract any polymerization which may occur but cause the resin to polymerize to a less water soluble product upon cooling. The acid catalyst which produces the optimum results has been found to be acetic acid. About 2 to 4% by weight acid catalyst based on the glue solids provide satisfactory results. Less acid catalyst reduces the pot life to a great extent, while an increase of catalyst is harmful to both clamp time and water resistance. When acetic acid is used as the acid catalyst, 36% or common acetic acid is utilized. From 0.5–1.25 cc. of the acid will supply the amount of catalyst required. Table IV indicated the proportions of acid catalyst herein employed.

Any grade of animal glue may be employed in the formulation as is usual in the production of animal glue adhesives. The amount of glue added to water is carefully measured to give an aqueous dispersion of glue which may then be heated to form a hot melt solution. Here the amount of glue employed may vary from about 25 to 40% solids dispersion with about a 33% solids aqueous dispersion preferred. The aqueous dispersion is heated to temperatures of from 60° C. to 70° C. preferably 65° C. to give the hot melt solution. An acid catalyst is added to this hot melt solution thus forming Component "a" of the formulation. To this hot melt solution is added Component "b," i. e. the condensation product and the formaldehyde suppressive agent and the formulation is maintained at this elevated temperature until employed as an adhesive. The advantages of using a hot melt application is that a short clamp time may be employed. By the process of our invention we have produced a fortified animal glue that may be applied as a hot melt, possesses an extended pot life at said elevated temperatures and also has increased water resistance.

TABLE IV

Effect of varying acid catalyst (acetic acid)

| | I | II | III | IV | V |
|---|---|---|---|---|---|
| Percent based on 33% solids animal glue | 0 | 0.4 | 2 | 4 | 6 |
| cc | 0 | 0.1 | 0.5 | 1.0 | 1.5 |
| Gel time at 65° C., hrs | 0.01 | 2 | 5.2 | >5.5 | >5.5 |

| Clamp time at 200 p.s.i., minutes | Dry Shear, p.s.i.-W.F. | Delamination, inches [1] | Dry Shear, p.s.i.-W.F. | Delamination, inches | Dry Shear, p.s.i.-W.F. | Delamination, inches | Dry Shear, p.s.i.-W.F. | Delamination, inches | Dry Shear, p.s.i.-W.F. | Delamination, inches |
|---|---|---|---|---|---|---|---|---|---|---|
| 5 | | | | | 350-0 | none | ([2]) | ([2]) | ([2]) | ([2]) |
| 10 | | | | | 310-20 | none | 300-0 | 0.75 | ([2]) | ([2]) |
| 15 | | | | | 410-10 | 0.375 | 360-0 | 0.625 | 260-0 | 2.75 |
| 30 | | | | | 410-70 | 0.625 | 350-30 | 0.875 | 190-0 | 3.0 |

[1] Edge delamination—over 2 inches unsatisfactory.
[2] Delamination due to insufficient clamp time.

Formulation:
    Component "a"—
        Animal glue (33% solids) _____ 25 gms.
        Acid catalyst (acetic acid) _____ As indicated.
    Component "b"—
        Resin A (45% solids) _____ 2.5 gms.
        Formaldehyde suppressing agent (urea) _____ 0.8 gm.

Our glue may be utilized in any process requiring a fortified animal glue. It is particularly useful in such applications as woodworking, i. e. furniture manufacture and wood veneer production.

I claim:

1. A process for producing a water resistant fortified animal glue possessing an extended pot life at elevated temperatures which comprises comixing (1) an aqueous dispersion of animal glue containing from 25 to 40% solids which has been heated to form a solution and to which has been added an acid catalyst of from 2 to 4% by weight based on the glue solids; and (2) a urea-formaldehyde tetraethylene pentamine modified condensation product in which the mol ratio of urea to formaldehyde is within the order of from about 1:2 to about 1:3, respectively, and wherein said modifier is present in an amount of from about 8% to about 12% by weight based on the weight of urea therein in the amount of from 12 to 16% by weight based on the solids to solids ratio of condensation product to animal glue, to which has been added a formaldehyde suppressing agent selected from the group consisting of urea, tetraethylene pentamine, sodium bisulfite, dicyandiamide, melamine, acetoguanamine, hydrogen peroxide, potassium permanganate, dimethyl ketone and methyl ethyl ketone in the amount of from 30 to 35% by weight based on the condensation product solids content.

2. A process for producing a water resistant fortified animal glue possessing an extended pot life at elevated temperatures which comprises comixing (1) an aqueous dispersion of animal glue containing from 25 to 40% solids which has been heated to form a solution and to which has been added acetic acid of from 2 to 4% by weight based on the glue solids; and (2) a urea-formaldehyde tetraethylene pentamine modified condensation product in which the mol ratio of urea to formaldehyde is within the order of from about 1:2 to about 1:3, respectively, and wherein said modifier is present in an amount of from about 8% to about 12% by weight based on the weight of urea therein in the amount of from 12 to 16% by weight based on the solids to solids ratio of condensation product to animal glue, to which has been added urea in the amount of from 30 to 35% by weight based on the condensation product solids content.

3. A water resistant fortified animal glue possessing an extended pot life at elevated temperatures which comprises a comixture of (1) an aqueous dispersion of animal glue containing from 25 to 40% solids which has been heated to form a solution and to which has been added an acid catalyst of from 2 to 4% by weight based on the glue solids; and (2) a urea-formaldehyde tetraethylene pentamine modified condensation product in which the mol ratio of urea to formaldehyde is within the order of from about 1:2 to about 1:3, respectively, and wherein said modifier is present in an amount of from about 8% to about 12% by weight based on the weight of urea therein in the amount of from 12 to 16% by weight based on the solids to solids ratio of condensation product to animal glue to which has been added a formaldehyde suppressing agent selected from the group consisting of urea, tetraethylene pentamine, sodium bisulfite, dicyandiamide, melamine, acetoguanamine, hydrogen peroxide, potassium permanganate, dimethyl ketone and methyl ethyl ketone in the amount of from 30 to 35% by weight based on the condensation product solids content.

4. A water resistant fortified animal glue possessing an extended pot life at elevated temperatures which comprises a comixture of (1) an aqueous dispersion of animal glue containing from 25 to 40% solids which has been heated to form a solution and to which has been added acetic acid of from 2 to 4% by weight based on the glue solids; and (2) a urea-formaldehyde tetraethylene pentamine modified condensation product in which the mol ratio of urea to formaldehyde is within the order of from about 1:2 to about 1:3, respectively, and wherein said modifier is present in an amount of from about 8% to about 12% by weight based on the weight of urea therein in the amount of from 12 to 16% by weight based on the solids to solids ratio of condensation product to animal glue, to which has been added urea in the amount of from 30 to 35% by weight based on the condensation product solids content.

References Cited in the file of this patent

UNITED STATES PATENTS

| | | |
|---|---|---|
| 2,075,276 | Ellis | Mar. 30, 1937 |
| 2,103,776 | Geistlich | Dec. 28, 1937 |
| 2,512,418 | Cornwell | June 20, 1950 |
| 2,535,475 | Anderson | Dec. 26, 1950 |
| 2,554,475 | Suen et al. | May 22, 1951 |

FOREIGN PATENTS

| | | |
|---|---|---|
| 662,633 | Great Britain | Dec. 12, 1951 |

OTHER REFERENCES

The Technology of Adhesives, Del Monte (Reinhold) 1947, pages 308, 309.